(12) United States Patent
Tang et al.

(10) Patent No.: US 7,325,022 B2
(45) Date of Patent: Jan. 29, 2008

(54) METHODS AND APPARATUS FOR DETERMINING APPROXIMATING POLYNOMIALS USING INSTRUCTION-EMBEDDED COEFFICIENTS

(75) Inventors: Ping T. Tang, Hayward, CA (US); Gopi K. Kolli, Concord, MA (US); Minda Zhang, Westford, MA (US)

(73) Assignee: Intel Corporation, Santa Clara, CA (US)

( * ) Notice: Subject to any disclaimer, the term of this patent is extended or adjusted under 35 U.S.C. 154(b) by 717 days.

(21) Appl. No.: 10/648,500

(22) Filed: Aug. 26, 2003

(65) Prior Publication Data

US 2005/0050132 A1     Mar. 3, 2005

(51) Int. Cl.
*G06F 1/02* (2006.01)
(52) U.S. Cl. .................................... 708/270
(58) Field of Classification Search .............. 708/270, 708/275, 276, 277
See application file for complete search history.

(56) References Cited

U.S. PATENT DOCUMENTS 6,597,394 B1 *  7/2003  Duncan et al. .......... 348/222.1
6,940,619 B1 *  9/2005  Easwar ..................... 358/3.01
2002/0116428 A1 *  8/2002  Stribaek et al. ............. 708/490

OTHER PUBLICATIONS

M.J.D. Powell. "Approximation Theory and Methods." Cambridge University Press, May 1981. pp. 85-95. ISBN: 0521295149.
"IEEE Standard for Floating-point Arithmetic." ANSI/IEEE Standard 754-1985. Published by The Institute of Electrical and Electronics Engineers, Inc., New York, New York. 1985.
Ping Tak Peter Tang. "Table-lookup Algorithms for Elementary Functions and Their Error Analysis." Proceedings of the 10th Symposium on Computer Architecture, pp. 232-236. Grenoble, 1991.
Cornea-Hasegan, M; Norin B. "IA-64 Floating-poing Operations and the IEEE Standard for Binary Floating-point Arithmetic." Intel Technology Journal Q4, 1999. http://www.intel.com/technology/itj/q41999/pdf/ia64fpbf.pdf.

* cited by examiner

*Primary Examiner*—Chuong D. Ngo
(74) *Attorney, Agent, or Firm*—Hanley, Flight & Zimmerman, LLC

(57) ABSTRACT

Methods and apparatus for determining approximating polynomials using instruction-embedded coefficients are disclosed. In particular, the methods and apparatus use a plurality of coefficient values stored in a plurality of instructions. The coefficient values are associated with a runtime approximating polynomial of a K-th root family function. The coefficient values and the instructions stored in an instruction memory enable the processor system to determine a K-th root family function approximation value based on the runtime approximating polynomial.

37 Claims, 6 Drawing Sheets

METHODS AND APPARATUS FOR DETERMINING APPROXIMATING POLYNOMIALS USING INSTRUCTION-EMBEDDED COEFFICIENTS

FIELD OF THE DISCLOSURE

The present disclosure relates generally to processor systems and, more particularly, to methods and apparatus for determining approximating polynomials using instruction-embedded coefficients within processor systems.

BACKGROUND

Algebraic and transcendental functions are fundamental in many fields of application. In particular, K-th root family functions of the form $(y)^{\pm 1/K}$, which include inverse functions, inverse square root functions and square root functions, are performance critical in many graphics applications. Traditional algorithms for these K-th root family functions are typically tailored for desktop computers (e.g., personal computers) and workstation platforms. These traditional algorithms typically provide relatively high precision and accuracy, ranging from approximately seven significant decimals (e.g., IEEE single precision floating point) to sixteen significant decimals (e.g., IEEE double precision floating point). Due to typical accuracy requirements, methods for calculating K-th root family functions usually require data memory accesses, which may require the computers or platforms on which the methods are implemented to have relatively large main memories and data caches.

Many emerging classes of handheld computing platforms such as, for example, handheld platforms based on the Intel® XScale™ processor family, rely heavily on K-th root family function approximation values. In particular, computer graphics capabilities and performance are highly dependent on the performance of the platform responsible for determining K-th root family function approximation values. However, when traditional K-th root family function computational methods are implemented on emerging classes of handheld platforms, these traditional computational methods often result in low and unpredictable performance because data memory accesses often affect the data memory access performance (e.g., corrupt the data cache) of a running application that calls the K-th root family functions.

The data memory access required by traditional methods for determining K-th root family function approximation values is due in part to the fact that these methods generally require function values to be calculated prior to a compilation phase and stored in a table in data memory. In addition, these traditional methods usually employ general polynomials having coefficients that are stored in data memory during a compilation phase.

Alternative methods for determining K-th root family function approximation values that do not require a table of pre-calculated function values have recently been developed. However, these alternative methods typically rely on polynomial functions that include coefficients that are not stored explicitly. Although these alternative methods have provided some improvement over the methods that use pre-calculated function values and tables stored in data memory, the polynomials used by these methods are restrictive and the accuracy of the final result (i.e. the K-th root family function value) is relatively low.

Another method for determining K-th root family function approximation values uses floating-point arithmetic. However, the use of floating-point arithmetic requires software emulation, which may decrease the overall performance of a processor based-platform when processing K-th root family functions.

DETAILED DESCRIPTION

The disclosed methods, apparatus and articles of manufacture may be used to calculate a runtime polynomial associated with a runtime approximating polynomial function of any transcendental or algebraic function. In particular, determining a runtime approximating polynomial function is described herein in connection with a K-th root family function of the form $(y)^{\pm 1/K}$, where K is an exponent scaling value and may be equal to any relatively small positive integer value (i.e., 1, 2, 3, etc.). The disclosed methods, apparatus and articles of manufacture may be used during a runtime phase within a processor system and may be carried out using only instruction memory accesses (i.e., without requiring data memory accesses). In particular, the examples described herein determine a runtime approximating polynomial by using approximating polynomial coefficient values that are stored in processor instructions during a compilation phase.

Processors such as, for example, processors from the Intel® XScale™ processor family, are capable of processing instructions that include stored coefficients. With these types of processors, an instruction may include an opcode bitfield associated with an executable operation and at least one bitfield associated with a coefficient value. The coefficient value may be used by the processor to execute an operation according to the opcode bitfield. In the case of an Intel® XScale™ processor, an 8-bit coefficient value may be stored within the coefficient bitfield of each instruction. However, the methods, apparatus and articles of manufacture described herein are not limited to processors capable of having only 8-bit coefficient values stored in an instruction, nor are they limited to use with processors from the Intel® XScale™ processor family. To the contrary, the methods, apparatus and articles of manufacture described herein may be used with any processor that supports the use of coefficient values within instructions.

As described in connection with the examples herein, approximating polynomial coefficients may be determined prior to a compilation phase so that during the compilation phase the approximating polynomial coefficients are embedded or otherwise stored in an instruction. For example, a coefficient value 166 may be stored in a multiplication instruction using the following program language.

During a compilation phase, a compiler may compile the above program language and store the coefficient value 166 in a bitfield associated with the multiplication instruction. Additionally, the coefficient value 166 and its associated multiplication instruction may be stored in an instruction memory of a processor system and may be used during a runtime phase. Two example methods for determining approximating polynomial coefficients are described in greater detail in connection with FIGS. 1 and 2. However, other example methods for determining the approximating polynomial coefficients may be used instead.

Figure 1:
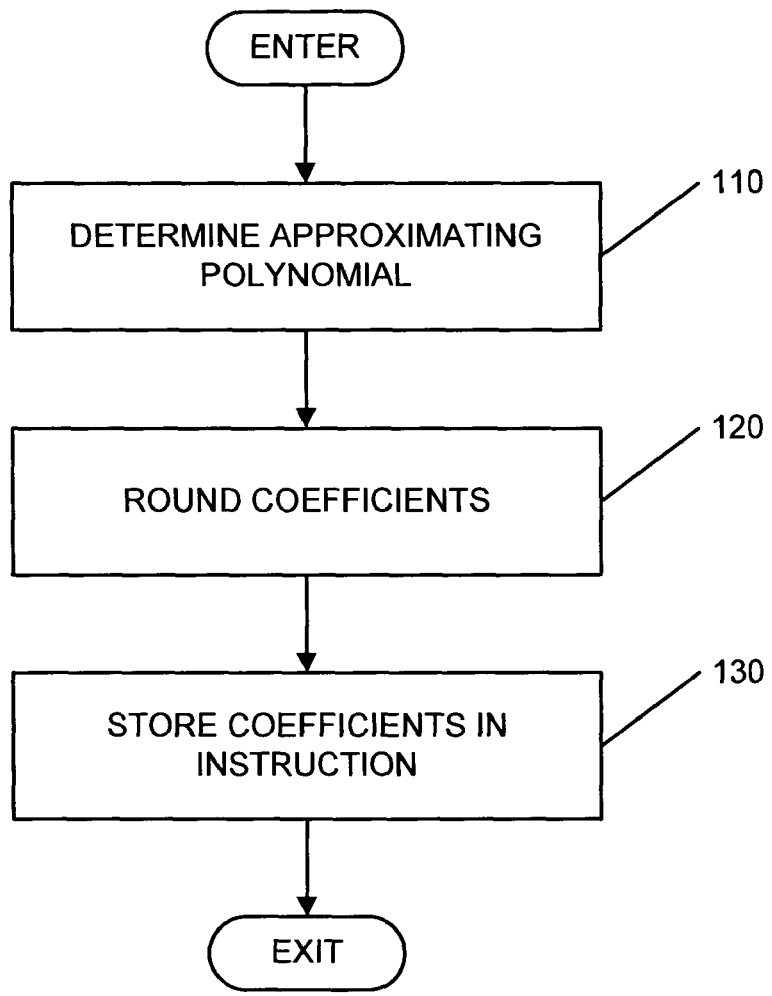
FIG. 1 is a flow diagram illustrating an example method for determining and storing approximating polynomial coefficient values.
Figure 2:
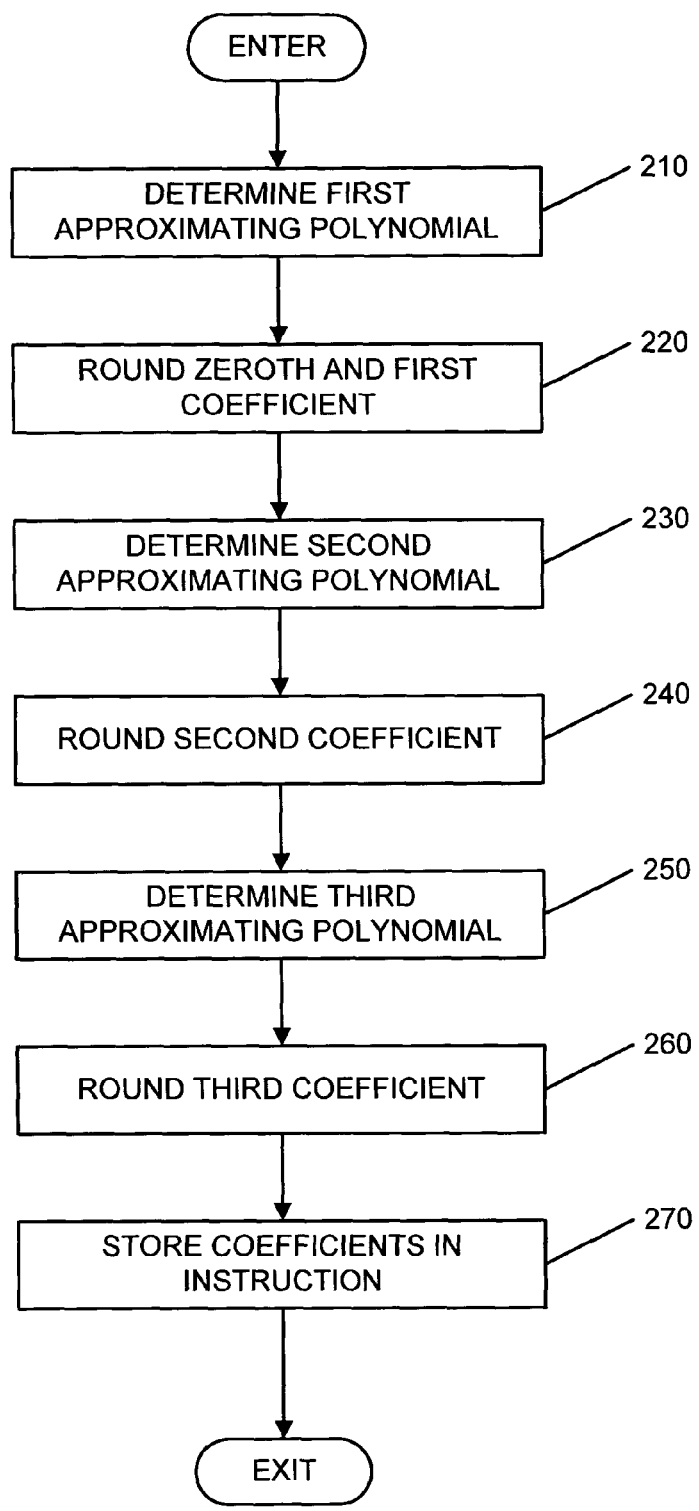
FIG. 2 is a flow diagram illustrating another example method for determining approximating polynomial coefficient values.

In addition, the approximating polynomials determined in FIGS. 1 and 2 include third-degree polynomials. However, as shown in Equation 1, a polynomial of any degree may be used to approximate any transcendental or algebraic function (e.g., the K-th root family function $(y)^{\pm 1/K}$).

$$p_A(x) = p_0 - p_1 \cdot x + p_2 \cdot x^2 - p_3 \cdot x^3 + \ldots -$$
$$p_{l-1} \cdot x^{l-1} + p_l \cdot x^l$$
$$\approx (y)^{-\frac{1}{K}}$$

Equation 1

The approximating polynomial $p_A(x)$ approximates the K-th root family function $(y)^{\pm 1/K}$, where $y=c_0+x$ for some center of expansion $c_0$. Additionally, the approximating polynomial $p_A(x)$ may include a polynomial of any degree as indicated by the value l, to approximate the K-th root family function $(y)^{\pm 1/K}$.

Approximating polynomial coefficients stored in an instruction may be referred to as instruction-embedded polynomial coefficients. As described in greater detail below in connection with FIGS. 3 and 4, instruction-embedded polynomial coefficients may enable a processor system to determine a runtime approximating polynomial of a K-th root family function $(y)^{\pm 1/K}$ using only instruction memory accesses. Furthermore, the processor system may use only instruction memory accesses to determine a K-th root family function approximation value based on the approximating polynomial. Although the apparatus and methods described herein relate generally to K-th root family functions of the form $(y)^{\pm 1/K}$, instruction-embedded polynomial coefficients may be used to determine any runtime polynomial and runtime polynomial value that approximate any transcendental or algebraic function.

FIG. 1 is a flow diagram illustrating an example method for determining and storing approximating polynomial coefficient values. An approximating polynomial of a K-th root family function of the form $(y)^{\pm 1/K}$ is determined (block 110) and coefficients of the approximating polynomial are rounded to eight significant bits (block 120) and embedded or otherwise stored in an instruction (block 130). The resulting instruction may be stored in an instruction memory (not shown). The approximating polynomial determined at block 110 may include any number of terms or term coefficients and, thus, may be a second-degree polynomial, a third-degree polynomial, a fourth-degree polynomial, etc. However, the example method for determining and storing approximating polynomial coefficient values is based on a third-degree approximating polynomial.

A K-th root family function approximation value may be determined for any input variable value y within the range $1 \leq y < 2$. The input variable value y may be represented in several forms, all of which may include a polynomial variable value x. For purposes of clarity, the input variable value y is represented in two forms below. A first form used to determine an approximating polynomial for an inverse function $(y)^{-1}$ (i.e., K=1), may be written as $y=1.5+x$, where $-0.5 \leq x < 0.5$. A second form of the input variable value y, which may be used to determine an approximating polynomial for an inverse square-root function $(y)^{-1/2}$, may be written as $y=1+x$, where the polynomial variable value x represents a fractional or decimal portion of the input variable value y. For example, for a value of y equal to 1.3, the input variable value y may be written as $y=1+x$, where solving for x yields $x=0.3$.

Generally, an approximating polynomial $p_a(x)$ of a K-th root family function $(y)^{\pm 1/K}$ may be determined using a minimax approximation. Alternatively, a Taylor series expansion or Chebyshev expansion could be used. A K-th root family function $(y)^{\pm 1/K}$ is shown in Equation 2 in terms of the polynomial variable x. Furthermore, as shown in Equation 3 below, the approximating polynomial $p_a(x)$ may include coefficient values $a_0$ through $a_3$.

$$\left(\frac{1}{y}\right)^{\pm \frac{1}{K}} = \left(\frac{1}{1.5+x}\right)^{\pm \frac{1}{K}} \text{ or } \left(\frac{1}{1+x}\right)^{\pm \frac{1}{k}}$$

Equation 2

$$p_a(x) = a_0 - a_1 \cdot x + a_2 \cdot x^2 - a_3 \cdot x^3$$

Equation 3

In Equation 3, the coefficient values $a_0$ through $a_3$ are used to determine 8-bit approximating polynomial coefficient values. In particular, the coefficient values $a_0$ through $a_3$ are respectively associated with a zeroth-degree term coefficient value $p_0$, a first-degree term coefficient value $p_1$, a second-degree term coefficient value $p_2$ and a third-degree term coefficient value $p_3$. Furthermore, the rounding operation (block 120) performed on the coefficient values $a_0$ through $a_3$ results in two 8-bit values that include the respective coefficient values $p_0$ through $p_3$. Additionally, as shown in Equation 4 below, an approximating polynomial $p(x)$ associated with the approximating polynomial $p_a(x)$ may include the coefficient values $p_0$ through $p_3$.

$$p(x) = p_0 - p_1 \cdot x + p_2 x^2 - p_3 \cdot x^3$$

Equation 4

The values or absolute values of the coefficient values $p_0$ through $p_3$ of Equation 4 may be stored in at least one instruction (block 130) during the compilation phase.

As can be seen in FIG. 1, the rounding operation (block 120) rounds the coefficient values $a_0$ through $a_3$ simultaneously. Such a simultaneous rounding operation may reduce the accuracy with which an approximating polynomial approximates the K-th root family function $(y)^{\pm 1/K}$. Another method described in connection with FIG. 2 below may be used to determine the coefficient values $p_0$ through $p_3$ to more accurately determine an approximating polynomial.

FIG. 2 is a flow diagram illustrating another example method for determining approximating polynomial coefficient values. The example method described in connection with FIG. 2 may provide a more accurate approximating polynomial of the K-th root family function $(y)^{\pm 1/K}$. In particular, in contrast to the example method of FIG. 1, the example method shown in FIG. 2 uses independent rounding operations for the coefficient values $a_0$ through $a_3$, which results in a more accurate representation of the approximating polynomial.

More specifically, after rounding the coefficient values $a_0$ and $a_1$, a second approximating polynomial, which includes a second coefficient value, is determined. After rounding the second coefficient value, a third approximating polynomial that includes a third coefficient value is determined. In this manner, the example method of FIG. 2 ensures greater approximation accuracy when determining an approximating polynomial because each successive coefficient value is based on a previously fixed coefficient value.

Now turning in detail to FIG. 2, a first approximating polynomial to a K-th root family function $(y)^{\pm 1/K}$ is determined (block 210) and is similar to the approximating polynomial $p_a(x)$ of Equation 3 above. The first approximating polynomial includes coefficients $a_0$ and $a_1$. The zeroth-degree term coefficient $p_0$ and the first-degree term coefficient $p_1$ are determined by rounding the coefficients $a_0$ and $a_1$ at block 220 to 8-bit values. The coefficients $p_1$ may be used at block 230 to determine a second approximating polynomial.

As shown in Equation 5, the first-degree term coefficients $p_1$ may be multiplied by the polynomial variable value x, resulting in a product that is subtracted from the inverse square root function of the input variable value y. A second approximating polynomial shown in Equation 6 approximates the function of Equation 5 and is determined at block 230.

$$\frac{1}{\sqrt{y}} - p_1 \cdot x \qquad \text{Equation 5}$$

$$1 + b_2 \cdot x^2 + b_3 \cdot x^3 \qquad \text{Equation 6}$$

As shown in Equation 6, the second approximating polynomial includes a coefficient value $b_2$. A second-degree term coefficient value $p'_2$ is determined by rounding the coefficient value $b_2$ to an 8-bit value (block 240).

The second-degree term coefficient $p'_2$ may be multiplied twice by the polynomial variable value x, resulting in a product that is subtracted from Equation 5 to produce a function according to Equation 7 below. A third approximating polynomial shown in Equation 8, which approximates the function of Equation 7, is then determined (block 250).

$$\frac{1}{\sqrt{y}} - p_1 \cdot x - p_2 \cdot x^2 \qquad \text{Equation 7}$$

$$1 + g_3 \cdot x^3 \qquad \text{Equation 8}$$

As shown in Equation 8, the third approximating polynomial includes a coefficient value $g_3$. A third-degree term coefficient value $p'_3$ is determined by rounding the coefficient value $g_2$ to an 8-bit value (block 260).

Equation 9 below shows an approximating polynomial of the K-th root family function $(y)^{\pm 1/K}$ including the coefficient values $p_0$ through $p'_3$.

$$p(x) = p_0 - p_1 \cdot x + p'_2 \cdot x^2 - p'_3 \cdot x^3 \qquad \text{Equation 9}$$

The values or absolute values of the coefficient values $p_0$ through $p'_3$ of Equation 9 may be stored in at least one instruction (block 270) during a compilation. Additionally, the coefficient values $p_0$, $p_1$, $p_2$ and $p_3$ described in connection with FIG. 1 and the coefficient values $p_0$, $p_1$, $p'_2$ and $p'_3$ described in connection with FIG. 2 may be calculated once prior to a compilation phase and used multiple times during a runtime phase to determine a runtime polynomial value. The runtime polynomial value may be associated with a runtime approximating polynomial value of a K-th root family function $(y)^{\pm 1/K}$ as set forth in greater detail below.

In the following description, the coefficient values $p_0$, $p_1$, $p_2$ and $p_3$ and the coefficient values $p_0$, $p_1$, $p'_2$ and $p'_3$ are referred to as the coefficient values $p_0$, $p_1$, $p_2$ and $p_3$.

The methods for determining a runtime approximating polynomial value of a K-th root family function $(y)^{\pm 1/K}$ described below may be implemented on an integer-based processor system as well as a non-integer based processor system (e.g., a floating-point processor system). However, in the case of an integer-based processor system implementation, it may be useful to scale certain values such as, for example, the approximating polynomial coefficient values $p_0$ through $p_3$ to prevent loss of accuracy, resolution or overflow of subsequently calculated values. For example, if a 32-bit value is to be multiplied by a 10-bit value using a 32-bit operation, it may be useful to first scale the 32-bit value down to a 22-bit value to prevent overflow during the 32-bit multiplication operation.

In addition to scaling, it may also be useful to represent decimal or fractional values as integers when using an integer-based processor system. In particular, the methods described in connection with FIGS. 3 and 4 use a Qk notation to represent decimal or fractional values as whole number integers, where the least significant bit of a value is related to $2^{-k}$.

Figure 3:
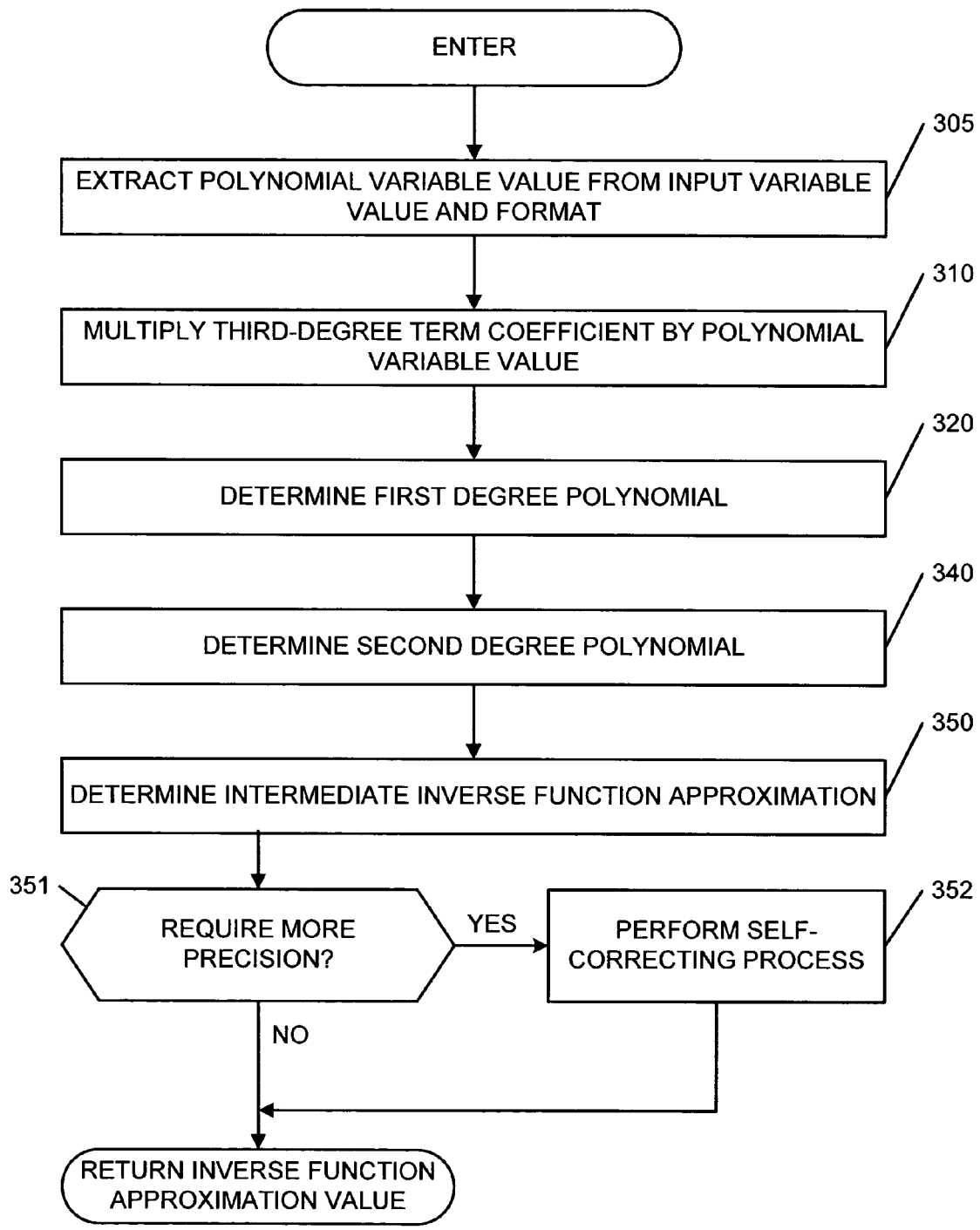
FIG. 3 is a flow diagram illustrating an example method for determining a runtime approximating polynomial value of an inverse function using instruction-embedded polynomial coefficient values.
Figure 4:
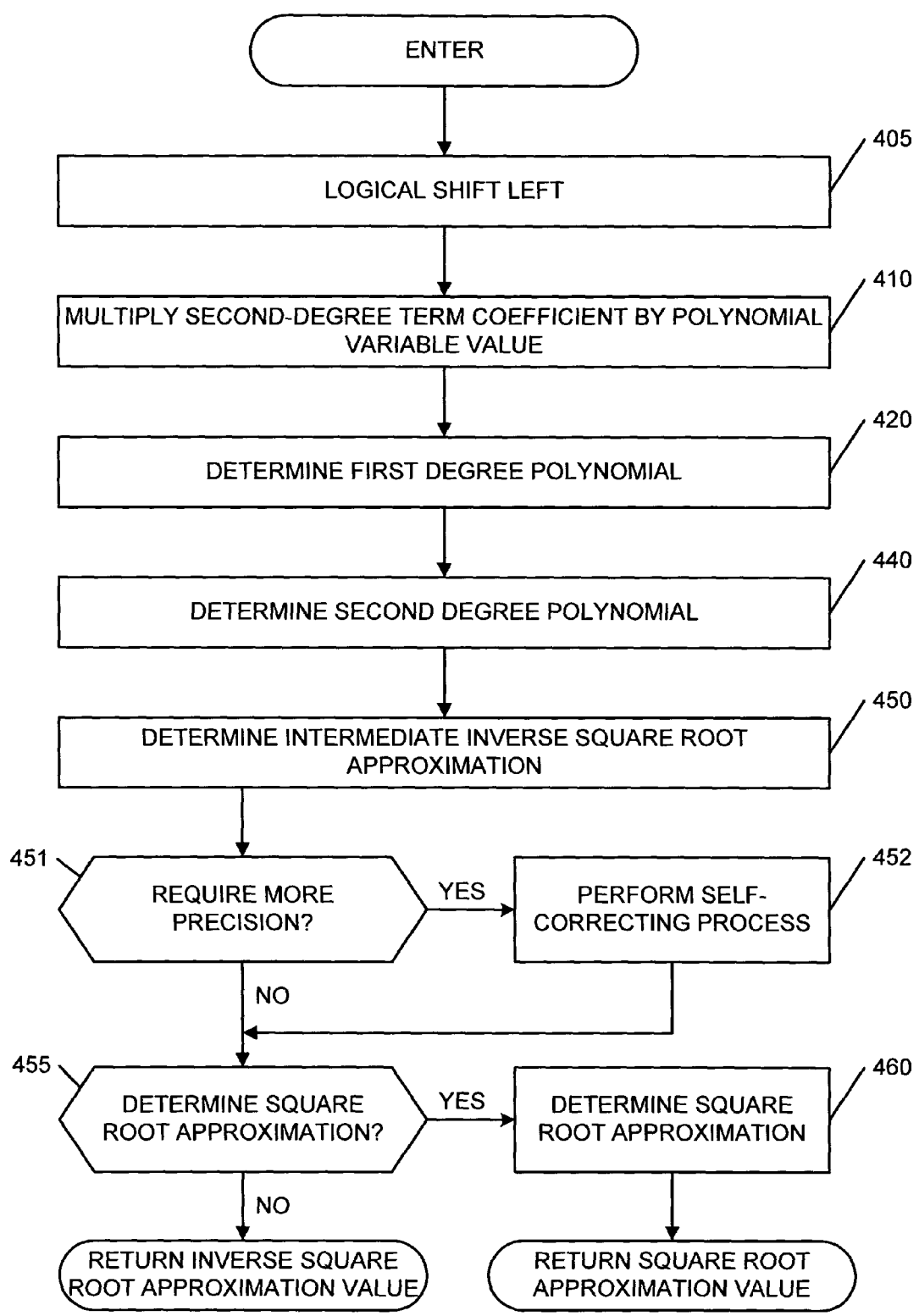
FIG. 4 is a flow diagram illustrating an example method for determining a runtime approximating polynomial value of an inverse square root function and a square root function using instruction-embedded polynomial coefficient values.

In general, the example methods described in connection with FIGS. 3 and 4 may be implemented using any integer-based or non-integer-based processor system capable of operations of any bit-length (e.g., 32-bit operations, 64-bit operation, etc.). However, for purposes of clarity, the example methods of FIGS. 3 and 4 are described in connection with a 32-bit integer-based processor system. Thus, scaling methods and Qk notation used in connection with the examples of FIGS. 3 and 4 are based on a maximum bit-length of 32 bits.

FIG. 3 is a flow diagram illustrating an example method for determining a runtime approximating polynomial value of an inverse function $(y)^{-1}$ (i.e., K=1) using instruction-embedded polynomial coefficient values. The example method of FIG. 3 includes four instruction-embedded polynomial coefficient values that are generally referred to as a zeroth-degree term coefficient value $p_0$, a first-degree term coefficient value $p_1$, a second-degree term coefficient value $p_2$ and a third-degree term coefficient value $p_3$.

During a runtime phase, a processor system (such as that shown in FIG. 6) may perform the example method depicted in FIG. 3 to determine a runtime approximating polynomial of an inverse function $(y)^{-1}$. By performing the operations of blocks 305-350 during a runtime phase, a runtime approximating polynomial may be used to determine a runtime approximating polynomial value of an inverse function $(y)^{-1}$. Specifically, the operations performed at blocks 305-350 reconstruct a runtime approximating polynomial similar to the approximating polynomial p(x) of Equation 4 using the instruction-embedded polynomial coefficient values $p_0$, $p_1$, $p_2$, and $p_3$, the input variable value y, the polynomial variable value x and a series of computational operations.

At runtime, the input variable value y may be provided in Q31 format and, as described in connection with FIG. 1, may be represented as y=1.5+x. The polynomial variable value x may be extracted from the input variable value y and formatted (block 305) through a series of operations. Performing a 1-bit logical shift left on the input variable value y results in a value y−1 in Q32 format. A value of 0.5 is then subtracted from the value y−1 to produce y−1.5, resulting in the polynomial variable value x (i.e., x=y−1.5) in Q32 format. A 22-bit arithmetic shift right formats the polynomial variable value x to Q10 format.

The third-degree term coefficient value $p_3$ may be retrieved from instruction memory and multiplied by the polynomial variable value x (block 310), where $p_3$ and x may each be represented in Q10 format. Multiplying the third-degree term coefficient value $p_3$ by the polynomial variable value x results in a product value $p_3 \cdot x$ in Q20 format.

A first-degree polynomial is then determined (block 320) by fetching or retrieving the second-degree term coefficient value $p_2$ from instruction memory, scaling it to Q20 format and subtracting the product value $p_3 \cdot x$ from the second-degree term coefficient value $p_2$ as shown in Equation 10 below.

$$p_2 - p_3 \cdot x \qquad \text{Equation 10}$$

As described below, the first-degree polynomial determined at block 320 may then be used to determine a second-degree polynomial.

A second-degree polynomial is determined (block 340) by retrieving the first-degree term coefficient value $p_1$ from instruction memory, formatting $p_1$ to Q16 format, multiplying the polynomial variable value x, which is in Q10 format, by a first-degree polynomial (e.g., the first-degree polynomial shown in Equation 10) and subtracting the result to the first-degree term coefficient value $p_1$. The second-degree polynomial is in Q30 format and may be represented as shown in Equation 11 below.

$$p_1 - p_2 \cdot x + p_3 \cdot x^2 \qquad \text{Equation 11}$$

A runtime approximating polynomial of the inverse function is then determined (block 350) by retrieving the zeroth-degree term coefficient value $p_0$ from instruction memory, formatting $p_0$ to Q14 format, multiplying the polynomial variable value x by a second-degree polynomial (e.g., the second-degree polynomial shown in Equation 11) and subtracting the result from the zeroth-degree term coefficient value $p_0$. The subtraction operation results in a runtime approximating polynomial value $p_v(x)$ of an inverse function in Q14 format and may be evaluated according to Equation 12 below.

$$u' = p_v(x) = p_0 - p_1 \cdot x + p_2 \cdot x^2 - p_3 \cdot x^3 \approx \frac{1}{1.5 + x} \qquad \text{Equation 12}$$

The inverse function $(y)^{-1}$ is shown as $1/1.5_{+x}$ and is approximated by a runtime approximating polynomial $p_v(x)$. The runtime approximating polynomial $p_v(x)$ may be used to determine an intermediate inverse function approximation value u'.

In general, if an application is configured to determine a more precise approximation (i.e., more significant bits) of the inverse function (block 351), a self-correcting process may be performed at block 352 on the intermediate inverse function approximation value u' to determine an inverse function approximation value u having a greater number of significant bits. For example, the intermediate inverse function approximation value u' may be represented by an 8-bit value, while the inverse function approximation value u may be represented by a more precise 16-bit value. If an application is not configured to determine a more precise value (block 351), then the inverse function approximation value u is set equal to the intermediate inverse function approximation value u'.

FIG. 4 is a flow diagram illustrating an example method for determining a runtime approximating polynomial value of an inverse square root function and a square root function using instruction-embedded polynomial coefficient values. The instruction-embedded polynomial coefficient values used in this example method generally include the zeroth-degree term coefficient value $p_0$, the first-degree term coefficient value $p_1$ and the second-degree term coefficient value $p_2$.

During a runtime phase, a processor system (such as that shown in FIG. 6) may perform the example method depicted in FIG. 4 to determine a runtime approximating polynomial of an inverse square root function. A runtime approximating polynomial may be used to determine a runtime approximating polynomial value of an inverse square root function and a square root function, which may be respectively associated with an inverse-square root approximation value and a square root approximation value. An inverse square root approximation value and/or a square root approximation value may be determined during a runtime phase by performing the operations of blocks 405-460. Specifically, the operations performed at blocks 405-460 reconstruct a runtime approximating polynomial similar to the approximating polynomial p(x) of Equation 3 at a runtime phase using the instruction-embedded polynomial coefficient values $p_0$, $p_1$ and $p_2$, the input variable value y, the polynomial variable value x and a series of computational operations.

At runtime, the input variable value y may be given as an input value in Q31 format and, as described in connection with FIG. 1, may be represented as y=1+x. The polynomial variable value x represents the decimal or fractional portion, which may be extracted from the input variable value y. Isolating the decimal or fractional portion includes performing a 1-bit logical shift left (block 405) on the input variable value y, resulting in the polynomial variable value x.

The second-degree term coefficient value $p_2$ may be retrieved from instruction memory and multiplied by the polynomial variable value x (block 410), where $p_2$ and x may each be represented in Q10 format. Multiplying the second-degree term coefficient value $p_2$ and the polynomial variable value x results in a product value $p_2 \cdot x$ in Q20 format, where the second-degree term coefficient value $p_2$ is associated with a runtime invariant value stored in instruction memory and the polynomial variable value x is provided at runtime (i.e., is a runtime variant value).

A first-degree polynomial is then determined (block 420) by fetching or retrieving the first-degree term coefficient value $p_1$ from instruction memory and scaling it to Q20 format and subtracting the product value $p_2 \cdot x$ from the first-degree term coefficient value $p_1$ as shown in Equation 13 below.

$$p_1 - p_2 \cdot x \qquad \text{Equation 13}$$

As shown in Equation 13, the first-degree polynomial determined at block 420 includes the polynomial variable value x and the approximating polynomial coefficient values $p_1$ and $p_2$. As described below, the first-degree polynomial determined at block 420 may then be used to determine a second-degree polynomial.

As depicted by the example method in FIG. 4, a second-degree polynomial is determined (block 440) by multiplying the polynomial variable value x, which is in Q10 format, by a first-degree polynomial (e.g., the first-degree polynomial shown in Equation 13). Furthermore, as depicted by Equation 14 below, the second-degree polynomial includes a second-degree term having the second-degree term coefficient value $p_2$ and a first-degree term having the first-degree term coefficient value $p_1$.

$$p_1 \cdot x - p_2 \cdot x^2 \qquad \text{Equation 14}$$

The second-degree polynomial shown in Equation 14 may be represented in Q30 format and may be used to determine a runtime approximating polynomial of the inverse square root function.

A runtime approximating polynomial of the inverse square root function is determined by retrieving the zeroth-degree term coefficient value $p_0$ from instruction memory, formatting $p_0$ to Q30 format and subtracting a second-degree polynomial (e.g., the second-degree polynomial shown in Equation 14) from the zeroth-degree term coefficient value $p_0$ (block 440). The subtraction operation results in a runtime approximating polynomial value $p_v(x)$ in Q30 format that is associated with a runtime approximating polynomial of an inverse square root function.

A runtime approximating polynomial may be used to calculate an intermediate inverse square root approximation value v' based on the approximating polynomial coefficient values $p_0$, $p_1$ and $p_2$ and the polynomial variable value x. The intermediate inverse square root approximation value v' is determined (block 450) by performing a rounding operation on the runtime approximating polynomial value $p_v(x)$. More specifically, the rounding operation may be used to convert the runtime approximating polynomial value $p_v(x)$ in Q30 format to a runtime approximating polynomial value $p_v(x)$ in Q8 format by adding a binary one to the twenty-first bit position of the runtime approximating polynomial value $p_v(x)$ and performing a 22-bit logical shift right operation. The runtime approximating polynomial value $p_v(x)$ in Q8 format includes the intermediate inverse square root approximation value v' as depicted in Equation 15 below.

$$v' = p_v(x) = p_0 - p_1 \cdot x + p_2 \cdot x^2 \approx \frac{1}{\sqrt{1+x}} \qquad \text{Equation 15}$$

The inverse square root function of the input variable value y is shown as $$\frac{1}{\sqrt{1+x}}$$

and is approximated by a runtime approximating polynomial that is used to determine the inverse square root approximation value v'.

In general, if an application is configured to determine a more precise approximation (i.e., more significant bits) of the inverse square root function (block 451), a self-correcting process may be performed at block 452 on the intermediate inverse square root approximation value v'. Thus, the self-correcting process (block 452) determines the inverse square root approximation value v based on the intermediate inverse square root approximation value v'. If an application is not configured to determine a more precise value (block 451), then the inverse square root approximation value v is set equal to the intermediate inverse square root approximation value v' from block 450 and control is passed to block 455 where an application may choose to determine a square root approximation value w.

If an application is not configured to determine a square root approximation value w (block 455), then the process may end with the inverse square root approximation value v as a result. On the other hand, if an application is configured to determine the square root approximation value w, then the inverse square root approximation value v is multiplied by the input variable value y (block 460) as shown in Equation 16 below.

$$w = y \cdot v \approx (1+x) \cdot \frac{1}{\sqrt{1+x}} = \sqrt{1+x} \qquad \text{Equation 16}$$

where, $$\frac{1}{\sqrt{1+x}} \approx p_0 - p_1 \cdot x + p_2 \cdot x^2$$

As shown in Equation 16, the square root approximation value w approximates the square root function of the input variable value y (i.e., $(y)^{1/2}$).

Although the approximation values v and w are depicted as being calculated using 8-bit coefficient values, these values may be calculated using larger bit length values if desired. For example, if the runtime invariant approximating coefficient values $p_1$ and $p_2$ are stored in instruction memory or retrieved from instruction memory as 16-bit values, a 16-bit value may be calculated at block 450 that includes the intermediate inverse square root approximation value v'.

One example method that may be used for retrieving 16-bit coefficient values from memory includes separating a 16-bit coefficient into two 8-bit values and storing each of the 8-bit values in a different instruction during a compilation phase. The instructions may be sequenced so that during a runtime phase, each 8-bit value that is stored in a different instruction may be easily concatenated to form a 16-bit coefficient. This method for retrieving coefficients having more than eight bits from instruction memory during runtime may be used for any number of coefficients having any desired bit length. Coefficients having more than eight bits may be implemented by using a processor system that supports having larger bit-length values stored in instructions.

Figure 5:
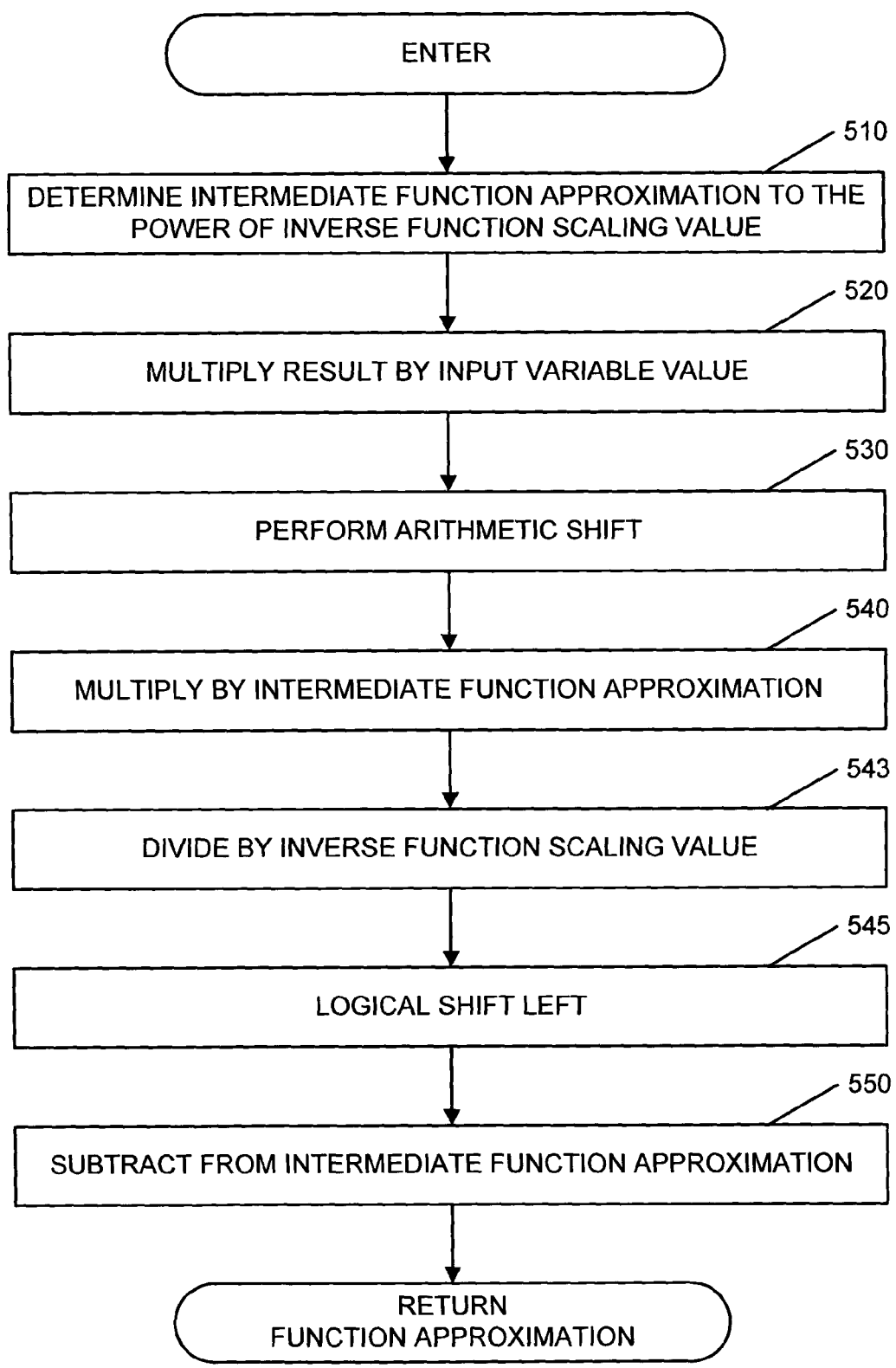
FIG. 5 is a flow diagram that depicts an example method for performing a self-correcting process that may be used to determine a function approximation value based on an intermediate function approximation value.

FIG. 5 is a flow diagram that depicts an example method for performing a self-correcting process that may be used to determine a function approximation value based on an intermediate function approximation value. In general, the self-correcting process may be used to determine a function approximation value f (i.e., a K-th root family function approximation value of the K-th root family function $(y)^{\pm 1/K}$) that includes a more precise representation of the intermediate function approximation value f'. For example, the intermediate function approximation value f' may be an 8-bit value. However, by performing the self-correcting process on the intermediate function approximation value f', a more precise value may be determined, such as, for example, a 16-bit value that includes the function approximation value f. The intermediate function approximation value f' is associated with the intermediate approximation values u' and v' of FIGS. 3 and 4. For example, if an application is configured to determine the inverse square root approximation value v, then the intermediate function approximation value f' is set equal to the intermediate inverse square root function approximation value v' and the resulting function approximation value f includes the inverse square root approximation value v.

The self-correcting process shown in FIG. 5 may be used to determine the function approximation value f based on the intermediate function approximation value f' and the input variable value y. For purposes of clarity, the intermediate function approximation value f' is depicted as being based on the intermediate inverse square root approximation v'. However, the self-correcting process may also be performed on the intermediate inverse function u' described in connection with FIG. 3 or any K-th root family function $(y)^{\pm 1/K}$.

The intermediate function approximation value f' may be mathematically represented in terms of an inverse square root function of the input variable value y as set forth in Equation 17 below. Alternatively, the intermediate function approximation value f' may be more precisely represented in terms of the inverse square root function of the input variable value y and an error approximation value e as set forth in Equation 18 below.

$$f' \approx \frac{1}{\sqrt{y}} \qquad \text{Equation 17}$$

$$f' = \frac{1}{\sqrt{y}} \cdot (1+e) \qquad \text{Equation 18}$$

As shown in Equation 17, the intermediate function approximation value f' is approximately equal to the inverse square root function of the input variable value y. Alternatively, Equation 18 shows that the intermediate approximation value f' may be equal to the inverse square root function of the input variable value y multiplied by a quantity 1+e. The error approximation value e is associated with an approximation factor introduced by determining the intermediate approximation value f' using an approximating polynomial value (e.g., the approximating polynomial value $p_v(x)$ of Equation 15). Persons of ordinary skill in the art will readily appreciate that the self-correcting process may be used to reduce the effect of the error approximation value e on the function approximation value f.

As depicted in FIG. 5, the intermediate function approximation value f' is raised to the power of the exponent scaling value K (block 510). The value of K is equal to two in the case of the intermediate inverse square root approximation value v'. Thus, the operation at block 510 determines a scaled intermediate function approximation value $f'^2$, which is alternatively shown in Equation 19 below. The scaled intermediate function approximation value $f'^2$ is multiplied by the input variable value y (block 520) to determine a product value $f'^2 \cdot y$ as shown in Equation 20 below.

$$\left(\frac{1}{\sqrt{y}} \cdot (1+e)\right)^K = \frac{1}{y} \cdot (1+e)^2 \qquad \text{Equation 19}$$

$$y \cdot \frac{1}{y} \cdot (1+e)^2 = (1+e)^2 \qquad \text{Equation 20}$$

Because the intermediate function approximation value f' is in Q9 format and the input variable value y is in Q16 format, the multiplication operation of blocks 510 and 520 may result in an overflow when performed using a 32-bit processor system. The product value $f'^2 \cdot y$, as shown in Equation 20, may be represented in Q32 format. Furthermore, the product value $f'^2 \cdot y$, which is in Q32 format, may include a binary one in bit position 31 (i.e., the most significant bit of a 32-bit register) and may be interpreted as a signed value. Thus, due to the overflow at blocks 510 and 520, the product value $f'^2 \cdot y$ approximates a value of one subtracted from Equation 20 as shown in Equation 21 below.

$$f'^2 \cdot y \approx 2 \cdot e + e^2 \qquad \text{Equation 21}$$

Next, an arithmetic shift operation (block 530) may be performed to format the product value $f'^2 \cdot y$ to an appropriate bit-length for subsequent mathematical operations. An arithmetic shift operation is used to preserve the sign-bit of the Q32 format signed product value $f'^2 \cdot y$. In particular, the arithmetic shift operation is performed as an 11-bit arithmetic shift right operation, which results in a product value $f'^2 \cdot y$ in Q21 format.

The product value $f'^2 \cdot y$, which is in Q21 format, is multiplied by the intermediate function approximation value f', which is in Q9 format, at block 540, resulting in a product value $f'^3 \cdot y$ in Q30 format. The product value $f'^3 \cdot y$ is then divided by the exponent scaling value K (block 543). The value of K is equal to two for the intermediate inverse square root approximation value v'. Thus, the operation at block 543 determines a scaled product value $$\frac{f'^3 \cdot y}{2},$$

which may be formatted in Q30 format. A 22-bit logical shift left operation is performed on the intermediate function approximation value f' (block 545) after which the product value $$\frac{f'^3 \cdot y}{2}$$

in Q30 format is subtracted from the resulting intermediate function approximation value f' (block 550). The subtraction operation at block 550 results in a 16-bit value in Q30 format that includes the function approximation value f. The function approximation value f includes the inverse square root approximation value v. Additionally, as a result of the self-correcting process, the inverse square root approximation value v is represented with greater precision (i.e., a 16-bit value) than the intermediate inverse square root approximation value v' (i.e., an 8-bit value determined at blocks 405-450 of FIG. 4).

Although a 16-bit function approximation value f may be determined using the methods described in connection with FIG. 5, a function approximation value f having more significant bits (i.e., of greater precision) may be used instead. In particular, the function approximation value f may be determined to a precision equivalent to the input variable value y and/or the polynomial variable value x provided in FIGS. 3 and 4. For example, on a 64-bit processor system a 64-bit input variable value y may be used to enable the methods of FIGS. 3, 4 and 5 to determine a 64-bit function approximation value f.

Additionally, multiple iterations of the self-correcting process described in connection with FIG. 5 may be performed to increase the precision of the function approximation value f. For example, for a 32-bit input variable value y, the methods of FIGS. 3 and 4 may be used to determine an 8-bit intermediate function approximation value f'. However, a 32-bit function approximation value f may be determined by performing two iterations of the self-correcting process on the 8-bit intermediate function approximation value f'. Each iteration of the self-correcting process increases the precision of the function approximation value f by a factor of two.

Figure 6:
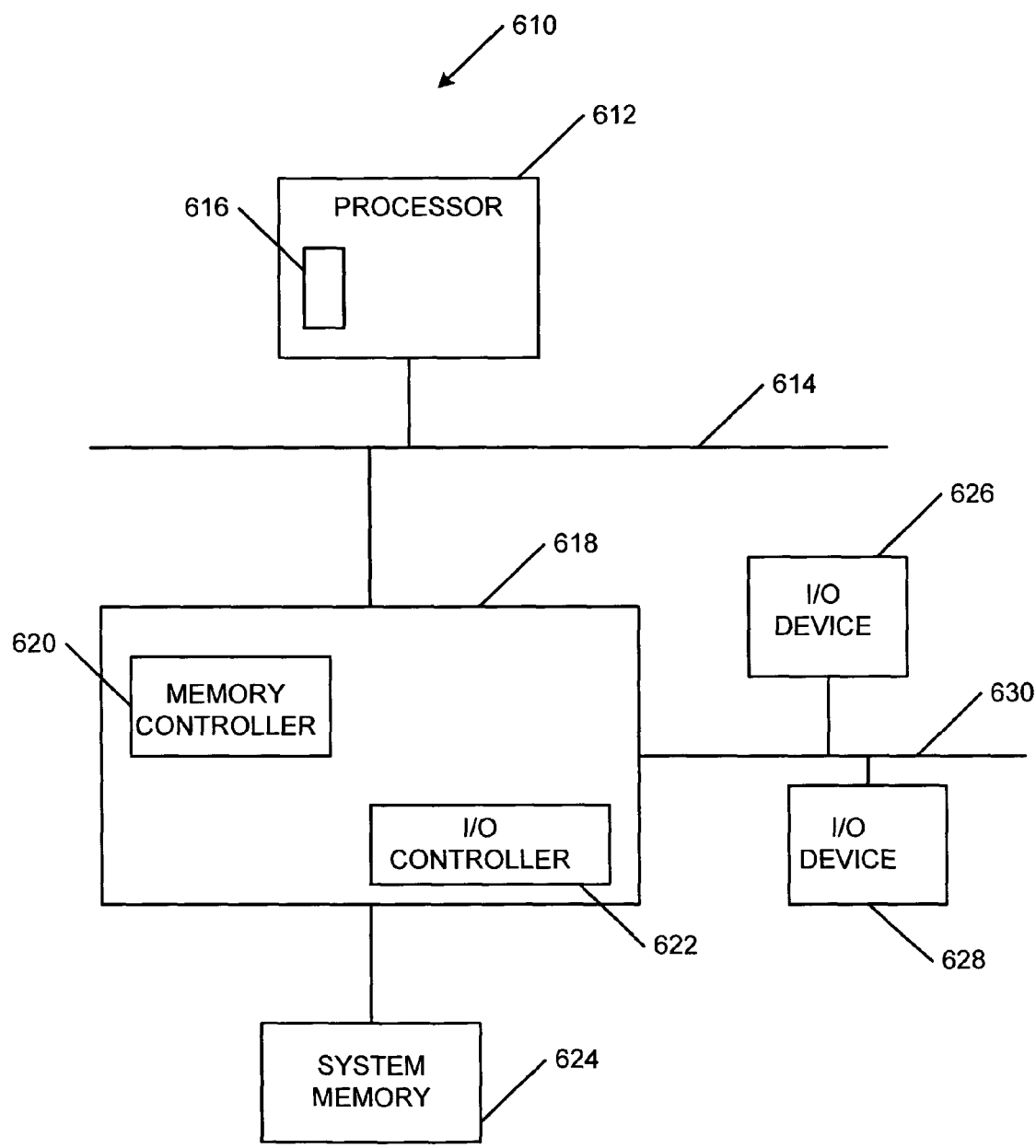
FIG. 6 is a block diagram of an example processor system that may be used to implement the apparatus and methods described herein.

FIG. 6 is a block diagram of an example processor system 610 that may be used to implement the apparatus and methods described herein. As shown in FIG. 6, the processor system 610 includes a processor 612 that is coupled to an interconnection bus or network 614. The processor 612 includes a register set or register space 616, which is depicted in FIG. 6 as being entirely on-chip, but which could alternatively be located entirely or partially off-chip and directly coupled to the processor 612 via dedicated electrical connections and/or via the interconnection network or bus 614. The processor 612 may be any suitable processor, processing unit or microprocessor such as, for example, a processor from the Intel X-Scale™ family, the Intel Pentium™ family, etc. In the example described in detail below, the processor 612 is a thirty-two bit Intel processor, which is commonly referred to as an IA-32 processor. Although not shown in FIG. 6, the system 610 may be a multi-processor system and, thus, may include one or more additional processors that are identical or similar to the processor 612 and which are coupled to the interconnection bus or network 614.

The processor 612 of FIG. 6 is coupled to a chipset 618, which includes a memory controller 620 and an input/output (I/O) controller 622. As is well known, a chipset typically provides I/O and memory management functions as well as a plurality of general purpose and/or special purpose registers, timers, etc. that are accessible or used by one or more processors coupled to the chipset. The memory controller 620 performs functions that enable the processor 612 (or processors if there are multiple processors) to access a system memory 624, which may include any desired type of volatile memory such as, for example, static random access memory (SRAM), dynamic random access memory (DRAM), etc. The I/O controller 622 performs functions that enable the processor 612 to communicate with peripheral input/output (I/O) devices 626 and 628 via an I/O bus 630. The I/O devices 626 and 628 may be any desired type of I/O device such as, for example, a keyboard, a video display or monitor, a mouse, etc. While the memory controller 620 and the I/O controller 622 are depicted in FIG. 6 as separate functional blocks within the chipset 618, the functions performed by these blocks may be integrated within a single semiconductor circuit or may be implemented using two or more separate integrated circuits.

The methods described herein may be implemented using instructions stored on a computer readable medium that are executed by the processor 612. The computer readable medium may include any desired combination of solid state, magnetic and/or optical media implemented using any desired combination of mass storage devices (e.g., disk drive), removable storage devices (e.g., floppy disks, memory cards or sticks, etc.) and/or integrated memory devices (e.g., random access memory, flash memory, etc.).

Although certain methods, apparatus and articles of manufacture have been described herein, the scope of coverage of this patent is not limited thereto. To the contrary, this patent covers all methods, apparatus and articles of manufacture fairly falling within the scope of the appended claims either literally or under the doctrine of equivalents.

What is claimed is:

1. A method comprising:
    retrieving a plurality of coefficient values from a plurality of instructions in an instruction memory;
    multiplying at least one of the plurality of coefficient values by a polynomial variable value to determine a runtime polynomial;
    determining a runtime polynomial value based on the runtime polynomial using instruction memory accesses;
    generating a graphic for display using the runtime polynomial value; and
    displaying the graphic via a display.

2. A method as defined in claim 1, wherein the runtime polynomial is associated with an approximating polynomial of a K-th root family function.

3. A method as defined in claim 2, wherein the K-th root family function includes at least one of an inverse function, an inverse square root function or a square root function.

4. A method as defined in claim 1, further comprising determining an inverse square root approximation value based on the runtime polynomial.

5. A method as defined in claim 4, wherein determining the inverse square root approximation value includes performing a self-correcting process on an intermediate inverse square root approximation value.

6. A method as defined in claim 4, further comprising determining a square root approximation value based on the inverse-square root approximation value.

7. An apparatus comprising:
    a processor system including an instruction memory;
    instructions stored in the instruction memory; and
    a plurality of coefficient values stored in the instruction memory, wherein the plurality of coefficient values are associated with a runtime polynomial, and wherein the instructions stored in the instruction memory enable the processor system to:
    determine a K-th root family function approximation value based on the runtime polynomial;
    generate a graphic for display using the K-th root family function approximation value; and
    display the graphic via a display.

8. An apparatus as defined in claim 7, wherein the runtime polynomial is associated with a runtime approximating polynomial of a K-th root family function.

9. An apparatus as defined in claim 7, wherein the instructions enable the processor system to determine the K-th root family function approximation value using only instruction memory accesses.

10. An apparatus as defined in claim 7, wherein the instructions enable the processor system to retrieve the plurality of coefficient values from the instruction memory.

11. An apparatus as defined in claim 7, wherein the instructions enable the processor system to determine at least one of an inverse function approximation value, an inverse square root approximation value or a square root approximation value based on the runtime polynomial.

12. An apparatus as defined in claim 11, wherein the instructions stored in the instruction memory enable the processor system to determine the inverse square root approximation value by performing a self-correcting process on an intermediate inverse square root approximation value.

13. An apparatus as defined in claim 11, wherein the instructions stored in the instruction memory enable the processor system to determine the inverse function approximation value by performing a self-correcting process on an intermediate inverse function approximation value.

14. A computer readable medium having instructions stored thereon that, when executed, cause a machine to:
retrieve a plurality of coefficient values from a plurality of instructions in an instruction memory;
multiply at least one of the plurality of coefficient values by a polynomial variable value to determine a runtime polynomial;
determine a runtime polynomial value based on the runtime polynomial using instruction memory accesses;
generate a graphic for display using the runtime polynomial value; and
display the graphic via a display.

15. A computer readable medium as defined in claim 14, wherein the runtime polynomial is associated with a runtime approximating polynomial of a K-th root family function.

16. A computer readable medium as defined in claim 14, wherein the runtime polynomial is associated with at least one of an inverse function, an inverse square root function or a square root function.

17. A computer readable medium as defined in claim 14 having instructions stored thereon that, when executed, cause the machine to determine a K-th root family function approximation value based on the runtime polynomial.

18. A method comprising:
retrieving at least one polynomial coefficient value from at least one instruction in an instruction memory;
determining a runtime approximating polynomial value based on the at least one polynomial coefficient value using only instruction memory accesses;
generating a graphic for display using the runtime approximating polynomial value; and
displaying the graphic via a display.

19. A method as defined in claim 18, wherein determining the runtime approximating polynomial value includes retrieving the at least one polynomial coefficient value from the instruction memory and using at least one of a multiplication operation or a subtraction operation.

20. A method as defined in claim 18, further comprising determining a K-th root family function approximation value by determining the runtime approximating polynomial value based on the at least one polynomial coefficient value, a K-th root family function or a polynomial variable value.

21. A system comprising:
a processor;
a memory coupled to the processor;
instructions stored in the memory; and
at least one polynomial coefficient value stored in at least one of the instructions, wherein the at least one polynomial coefficient value is associated with a runtime approximating polynomial of a K-th root family function, and wherein the instructions enable the processor to:
calculate a K-th root family function approximation value based on the runtime approximating polynomial of the K-th root family function;
generate a graphic for display using the K-th root family function approximation value; and
display the graphic via a display.

22. A system as defined in claim 21, wherein the instructions enable the processor to calculate the runtime approximating polynomial of the K-th root family function using the at least one polynomial coefficient value and a polynomial variable value.

23. A system as defined in claim 21, wherein the instructions enable the processor to calculate the runtime approximating polynomial of the K-th root family function by retrieving the at least one polynomial coefficient value from the at least one of the instructions and using at least one of a multiplication operation or a subtraction operation.

24. A computer readable medium having instructions stored thereon that, when executed, cause a machine to:
retrieve at least one polynomial coefficient value from at least one instruction associated with an instruction memory;
determine a runtime approximating polynomial value based on the at least one polynomial coefficient value using only instruction memory accesses;
generate a graphic for display using the runtime approximating polynomial value; and
display the graphic via a display.

25. A computer readable medium as defined in claim 24 having instructions stored thereon that, when executed, cause the machine to determine the runtime approximating polynomial by retrieving the at least one polynomial coefficient value from the instruction memory and using at least one of a multiplication operation or a subtraction operation.

26. A computer readable medium as defined in claim 24 having instructions stored thereon that, when executed, cause the machine to determine a K-th root family function approximation value by determining the runtime approximating polynomial value based on the at least one polynomial coefficient value, a K-th root family function or a polynomial variable value.

27. A method comprising:
retrieving at least one polynomial coefficient value from at least one instruction;
determining a runtime approximating polynomial of at least one of a transcendental function or an algebraic function based on the at least one polynomial coefficient value and a polynomial variable value;
determining a function approximation value based on the runtime approximating polynomial using only instruction memory accesses;
generating a graphic for display using the function approximation value; and
displaying the graphic via a display.

28. A method as defined in claim 27, wherein determining the runtime approximating polynomial of the at least one of a transcendental function and an algebraic function includes retrieving the at least one polynomial coefficient value from the at least one instruction and using at least one of a multiplication operation or a subtraction operation.

29. A method as defined in claim 27, wherein determining the function approximation value includes determining an intermediate function approximation value based on the at least one polynomial coefficient value.

30. A system comprising:
a processor system;
a memory coupled to the processor system;
instructions stored in the memory; and
at least one polynomial coefficient value stored in at least one of the instructions, wherein the at least one polynomial coefficient value is associated with a runtime approximating polynomial of at least one of a transcendental function or an algebraic function, and wherein the instructions enable the processor system to:

determine a function approximation value based on the runtime approximating polynomial of the at least one of a transcendental function and an algebraic function;

generate a graphic for display using the function approximation value; and display the graphic via a display.

31. A system as defined in claim 30, wherein the instructions enable the processor system to calculate the runtime approximating polynomial of the at least one of the transcendental function or the algebraic function using a polynomial variable value and the at least one polynomial coefficient.

32. A system as defined in claim 30, wherein the instructions enable the processor system to calculate the runtime approximating polynomial of the at least one of the transcendental function or the algebraic function by retrieving the at least one polynomial coefficient value from the at least one of the instructions and using at least one of a multiplication operation or a subtraction operation.

33. A system as defined in claim 30, wherein the instructions enable the processor system to calculate an intermediate function approximation value using the at least one polynomial coefficient.

34. A system as defined in claim 33, wherein the instructions enable the processor system to calculate the function approximation value by performing a self-correcting process on the intermediate function approximation value.

35. A computer readable medium having instructions stored thereon that, when executed, cause a machine to:

retrieve at least one polynomial coefficient value from at least one instruction;

determine a runtime approximating polynomial of at least one of a transcendental function or an algebraic function based on the at least one polynomial coefficient value and a polynomial variable value;

determine a function approximation value based on the runtime approximating polynomial using only instruction memory accesses;

generate a graphic for display using the function approximation value; and display the graphic.

36. A computer readable medium as defined in claim 35 having instructions stored thereon that, when executed, cause the machine to determine the runtime approximating polynomial of the at least one of the transcendental function or the algebraic function by retrieving the at least one polynomial coefficient value from the at least one instruction and using at least one of a multiplication operation or a subtraction operation.

37. A computer readable medium as defined in claim 35 having instructions stored thereon that, when executed, cause the machine to determine the function approximation value by determining an intermediate function approximation value based on the at least one polynomial coefficient value.

* * * * *